Inventors
James M. Harrison
Robert E. Smucker
by Parker & Carter
Attorneys

Sept. 6, 1960  J. M. HARRISON ET AL  2,951,260
MOLDING MECHANISM AND HEATING ARRANGEMENT
Filed Oct. 1, 1957  4 Sheets-Sheet 3

Inventors
James M. Harrison
Robert E. Smucker
by Parker & Carter
Attorneys

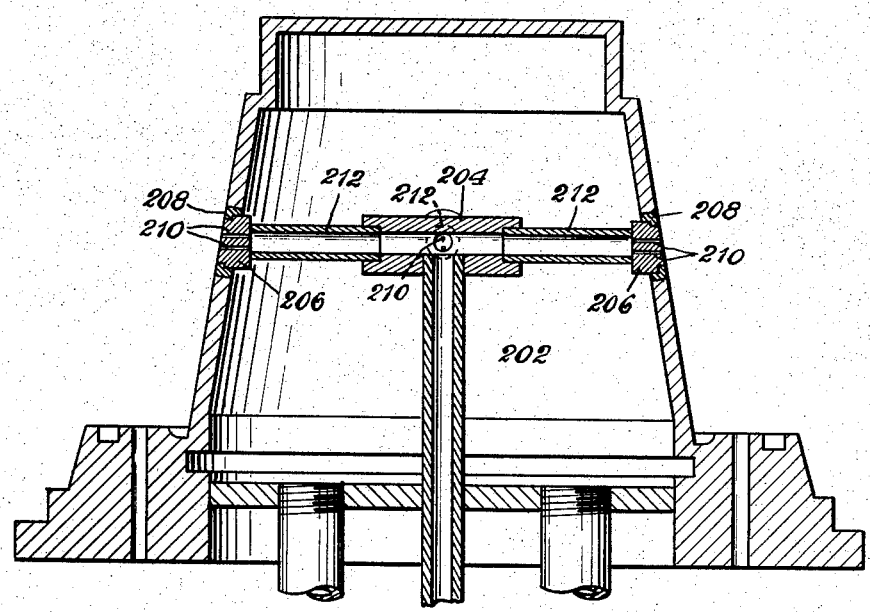
Fig. 5
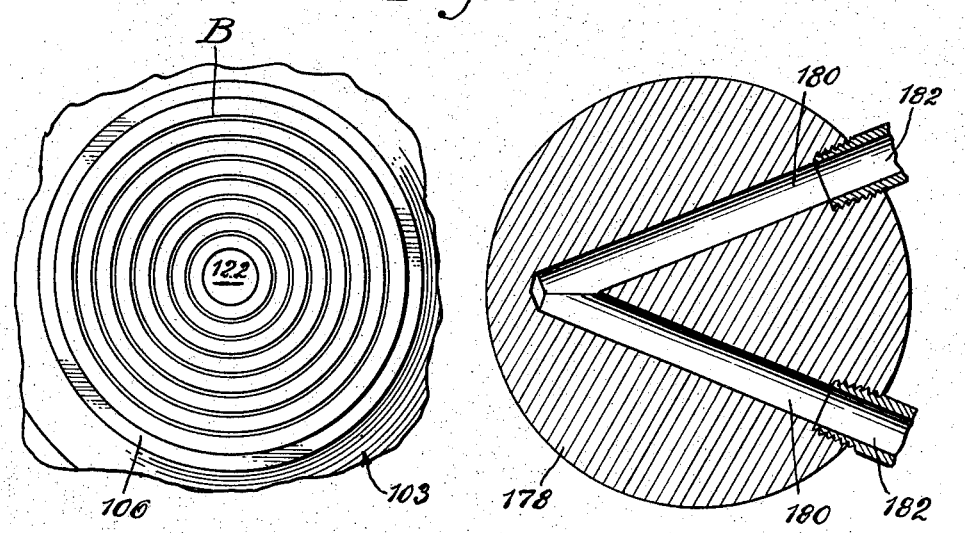
Fig. 4
Fig. 6
Inventors
James M. Harrison
Robert E. Smucker
by Parker & Carter
Attorneys _United States Patent Office_

2,951,260
Patented Sept. 6, 1960

2,951,260

MOLDING MECHANISM AND HEATING ARRANGEMENT

James M. Harrison and Robert E. Smucker, Fort Worth, Tex., assignors to Crown Machine and Tool Company, Fort Worth, Tex., a corporation of Texas Filed Oct. 1, 1957, Ser. No. 687,394

13 Claims. (Cl. 18—5)

This invention is in the field of molding machines and is concerned with ways and means for molding what shall be referred to as "foamable plastics." Such a plastic may take the form of beads which may be any suitable plastic material charged with a foaming agent or gas. For example, the plastic might be polystrene or the like, and the foaming or charging agent may be methylchloride, butane, heptane, or the like. Foamed materials as such are not new. For example, polystyrene foam may now be purchased from Monsanto Chemical Company, Dow Chemical Company, Koppers Company, and others. Normally the plastic material is supplied as small beads impregnated with the foaming agent. The size of such beads may run on the order of 60 to 70 thousandths in diameter, and in all cases the raw beads are finely divided, clear and crystalline.

The beads are prefoamed before molding. Prefoaming involves bringing the beads to an intermediate temperature below their maximum foaming temperature, for example, on the order of 190° at the prefoam temperature, when they have a maximum foaming temperature of from 230° to 240° F. in the case of polystyrene foam. When brought to the intermediate temperature, say, 190° F., the beads will swell up to an intermediate size where they can be more easily handled. This invention is concerned with taking such beads, after they have been prefoamed, and molding them into a relatively thin-walled drinking cup or container.

A primary object of this invention is a mechanism for molding such prefoamed beads into a finished, thin-walled cup-like container, or any precision sized article.

Another object is a molding mechanism with an arrangement for filling the mold with prefoamed beads by the use of vacuum.

Another object is a machine of the above type with an improved heating and cooling structure.

Another object is a machine of the above type with an improved cavity insert.

Another object is a core and cavity arrangement in a simplified molding machine with an efficient vacuum filling mechanism.

Another object is an improved molding cavity that insures proper cavity filling with prefoamed beads.

Another object is a transfer valve for conveying a predetermined quantity of the prefoamed beads to the cavity from an offset hopper.

Another object is an improved heating arrangement in a transfer valve for a machine of the above type.

Another object is a tiltably mounted core structure in a machine of the above type to facilitate stripping or ejection of the finished part.

Another object is a molding cavity of the above type with a completely open top.

Another object is a dielectrically heated open topped molding cavity of the above type.

Another object is an improved stripping mechanism for a machine of the above type.

Other objects will appear from time to time in the ensuing specification and drawings in which:

Figure 4 is a top view of a modified core;

Figure 5 is a side view, in section, of a modified core structure; and

Figure 6 is a horizontal section of a part of the transfer valve.

Figure 1:
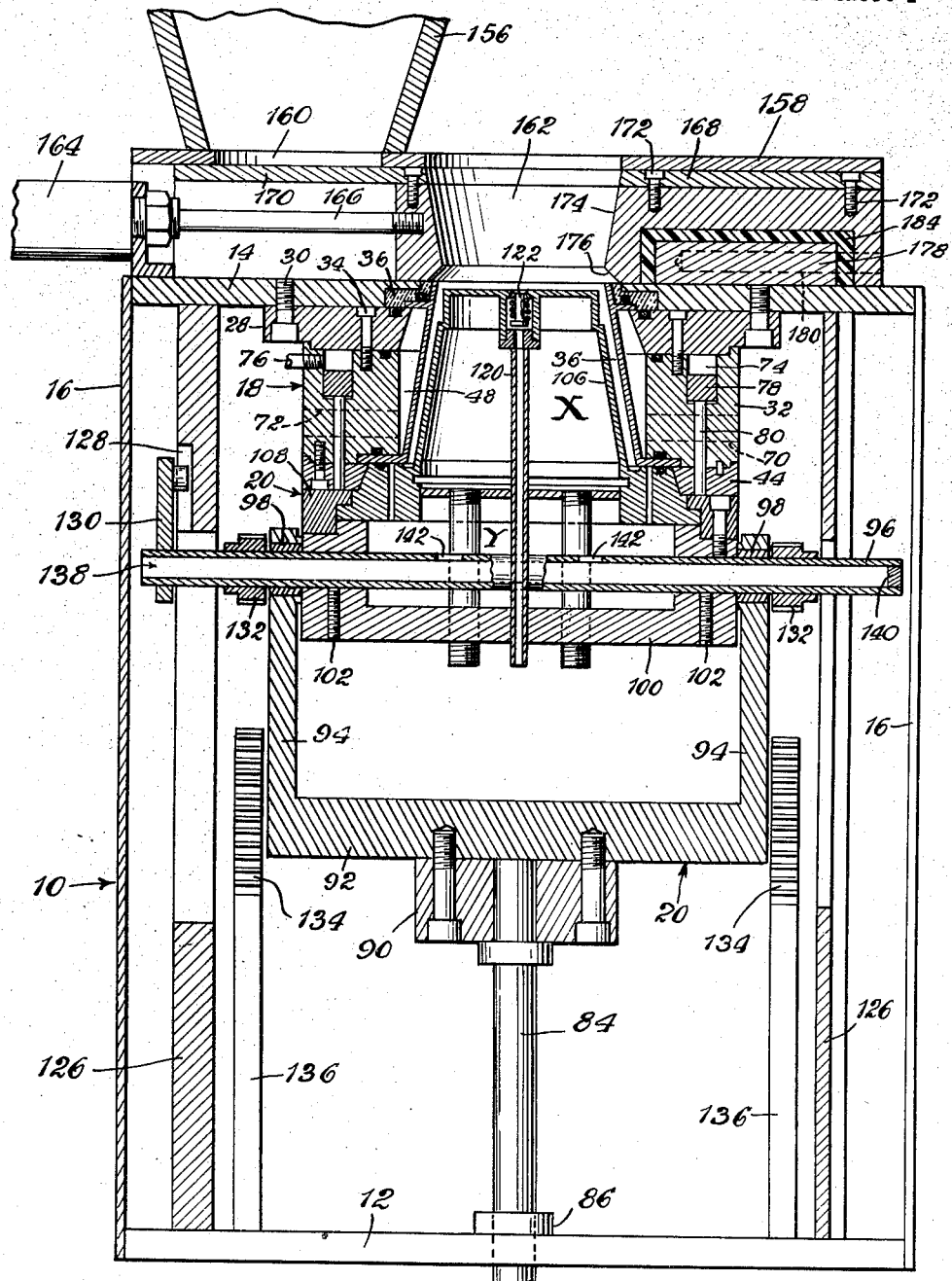
Figure 1 is a side view in section of a machine embodying or capable of performing this invention.

In Figure 1 the molding machine has been shown as including a frame 10 mounted on any suitable base (not shown). The frame may have a base plate or the like 12 and a top or cavity support plate 14 with suitable side guides or braces 16 extending between them. It should be understood that there may be a suitable platform or base frame, not shown, on which the frame 10 is mounted.

The frame carries mold parts which include a cavity element, indicated generally at 18, and a core element, indicated generally at 20. These elements are movably mounted relative to each other. In this case the cavity element is shown as fixed while the core element moves, so that the mold may be opened and closed, in a manner to be set forth hereinafter.

The top or cavity support plate 14 is provided with a generally central opening at 22, which is offset at 24 to receive an insulator ring 26 of any suitable insulating material. This ring is held in place by an upper cavity body 28 suitably connected to the bottom of the cavity support plate 14 by any suitable means, such as screws 30, so as to extend under the insulating ring. A somewhat cylindrical part, designated generally at 32, and hereinafter referred to as the lower cavity body, is connected to the upper cavity body by any suitable means, such as a plurality of bolts 34 or the like.

A cavity mold or insert 36 is positioned in the central opening and held therein in the following manner. It will be noted that the cavity insert is somewhat frusto-conically shaped or tapered, small end up, and flanges for sealing and support are provided adjacent each end. For example, an outstanding flange 38 is provided adjacent the upper end or top which bears against the insulator ring 26 with its upper surface and against the upper cavity body 28 with a part of its lower surface. The flange 40 at the large or bottom end of the insert extends into an offset, designated generally 42, in the lower cavity body and is held therein by a cavity retaining ring 44 or the like which slightly overlaps the flange 40 and is connected to the lower cavity body by any suitable means, such as a plurality of screws 46 or the like. It should be noted that the upper and lower cavity bodies define a chamber 48 with the outside of the cavity insert between the upper and lower flanges for heating and cooling thereof, as set forth hereinafter.

The insulator ring 26 is provided with a suitable annular groove or channel 50 and a suitable sealing means, such as the O-ring 52 which bears against the upper side of the top flange 38 on the cavity insert. The upper cavity body may be likewise recessed with an annular groove at 54 and provided with a suitable sealing means, such as an O-ring 56. An annular channel 58 and O-ring seal 60 may be provided between the upper and lower cavity bodies, on either one or the other but, as shown, on the lower cavity body. The offset 42 at the lower end of the lower cavity body may be provided with a suitable annular channel or the like 62 and a suitable O-ring seal 64 which bears against the top surface of the bottom flange 40 on the cavity insert. The various parts may be piloted or otherwise fitted together for proper assembly such as by the shoulder 66 between the upper and lower cavity bodies and 68 between the lower cavity body and the cavity retaining ring.

It will be understood that the chamber 48 around the cavity insert may be annular and continuous, and suitable heating and cooling fluids may be provided thereto by a suitable inlet connection or port 70 and exhausted therefrom by a suitable outlet or port 72.

Figure 2:
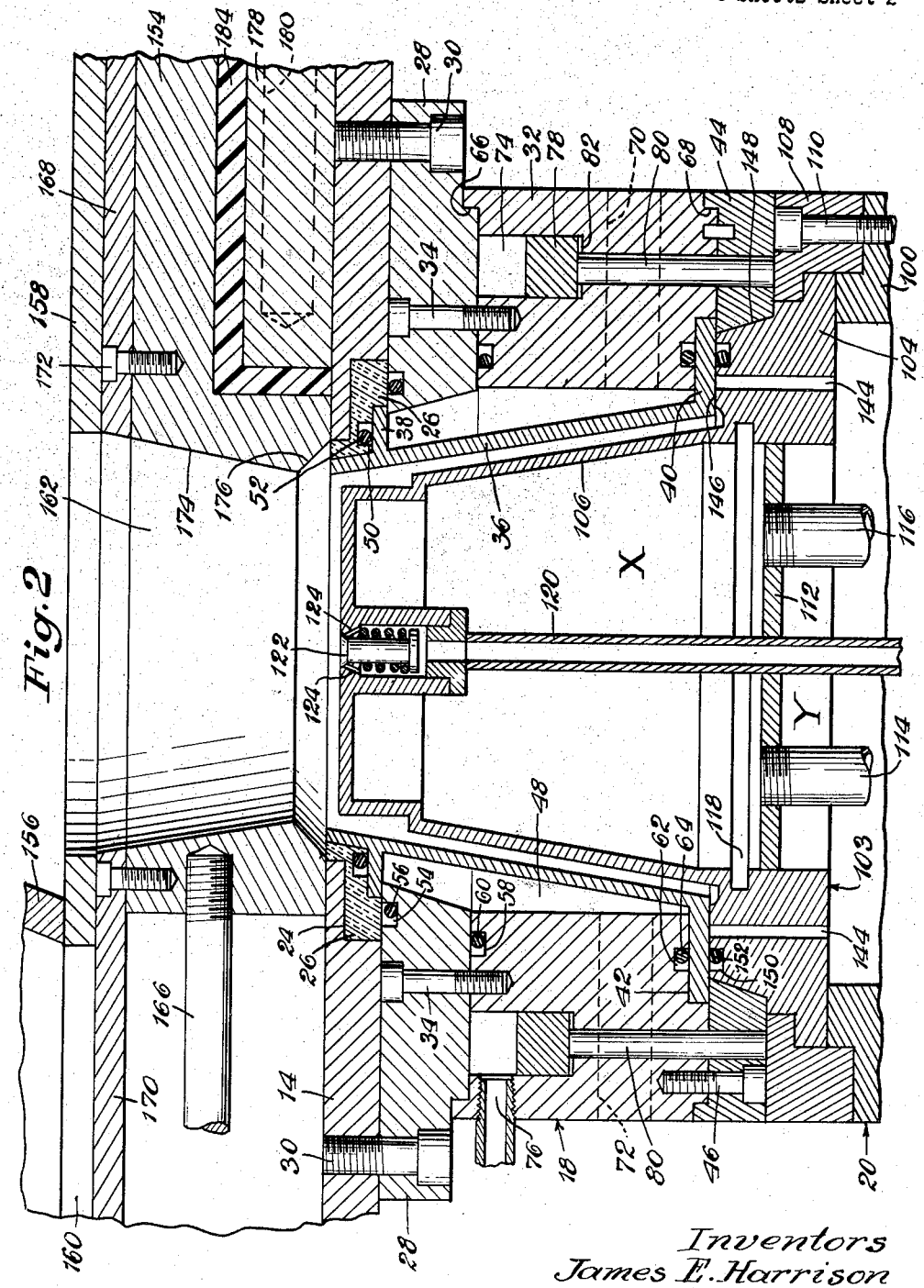
Figure 2 is an enlarged section of a part of Figure 1.

An annular slot or chamber 74 may be provided in the lower cavity body with a suitable connection 76 to a source of pressure air, for example. The chamber may be provided with a piston ring 78 which bears against a plurality of stand-off pins 80 disposed in a circle in suitable channels or passages in the cavity body projecting through the retaining ring 44. When pressure air is supplied to the upper side of the piston ring 78 through the connection 76, the ring will depress the pins, projecting them slightly below the lower surface of the cavity retaining ring. In Figure 2 the amount of excursion of the pins, as a group, is shown as small due to the slight spacing as at 82 between the ring 78 and the bottom of the chamber 74.

The core element, designated generally at 20, is carried in its entirety on a suitable piston rod 84 which extends through and is guided, as at 86, by the base plate and may be actuated by a suitable lower power cylinder, not shown. The upper end of the piston rod is suitably connected at 90 to a yoke 92. The arms 94 of the yoke rotatably carry a core support shaft 96 and are provided with suitable bushings or bearings 98 so that the core proper may rotate. A suitable bottom core support 100 is shown as fixed to the support shaft 96 by suitable set screws 102 so as to be rotatable therewith. A core element 103 with a base flange or ring 104 and a relatively thin upstanding or projecting core 106 is held on the core support by a suitable retaining ring 108 by any suitable means, such as a plurality of bolts 110. The inside of the core support and a suitable wall 112 or the like is provided in the middle of the combined chamber to divide it into two separate compartments X and Y. Heating and cooling fluids may be admitted to the upper compartment by a suitable pipe or the like 114 and exhausted therefrom by a similar pipe 116, each being connected to the dividing wall 112 and extending through the core support 100 to be connected to suitable flexible hoses or the like. The source of the heating and cooling fluids is not shown. The upper chamber X is provided with a suitable annular groove, ring or indentation 118 adjacent the lower edge of the molding cavity for a reason to be set forth hereinafter.

An air pipe or the like 120 which may be bent around the support shaft 96 extends through the chambers to a suitable spring biased air valve 122 which opens a plurality of air passages 124 into the bottom of the molded part.

A pair of cam guides 126 may be mounted on the frame having suitable cam grooves 128 to engage a cam follower 130 carried on the core support shaft. Gears or pinions 132 are also carried on the core support shaft to engage rack surfaces 134 on brackets 136, which may also be mounted on the frame.

A source of vacuum, such as an air pump, may be connected to one end of the support shaft as at 138 with the other end being plugged at 140. Suitable holes 142 may be provided in the support shaft 96 so that the source of vacuum will be communicated to the lower chamber Y. A plurality of passages or channels 144 may be provided in the large lower flange 104 of the core element to communicate the source of vacuum to the point of engagement between the cavity and core elements. It should be noted that the cavity and core elements abut along or between surfaces 146 and proper seating is acquired through pilot surfaces 148 that include frustoconic surfaces on the cavity retaining ring and the core mold. The upper surface of the core mold may be provided with a suitable annular channel 150 and O-ring seal 152 that engages the flange 40 at the large end of the cavity insert.

A slide or transfer valve 154 on the cavity or top support plate transfers material from a suitable hopper 156 to the molding cavity. A cover plate 158 is mounted on the frame and may be provided with suitable side plates so that the slide valve moves back and forth in a guide or channel. The cover plate has a suitable opening at 160 so that partially foamed beads may fall into a transfer chamber 162 in the slide valve when that cavity is positioned below the hopper. When the cavity is positioned over the mold, the partially foamed beads are free to be drawn into the molding cavity and the motion of the slide valve may be obtained by a suitable air cylinder 164 and piston rod 166, or otherwise. The slide valve is provided with a suitable sealing plate 168 on its upper surface which has a lateral extension 170 to close the bottom of the hopper when the transfer chamber is over the molding cavity. This plate may be held on the slide by any suitable means, such as the screws 172. The transfer chamber itself has oppositely disposed conical portions, the upper portion being designated 174 and the lower 176 with the upper portion having the smaller angle of divergence but extending the greater axial distance. It should be noted that the angle of divergence of the lower portion 176 is on the order of 45° or greater.

The slide or transfer valve has a heating element positioned in a suitable recess. The element may include a disc 178 formed of a good heat conducting material, such as aluminum. Two passages 180, which may come together in a V, are in the disc with suitable connections 182 for a heating fluid such as steam or hot air. The lower surface of the heating disc closes the top of the otherwise open cavity when the valve is in its left position in Figure 1 with the transfer chamber under the hopper. The heating disc may be surrounded with an insulator cap 184 made of any suitable insulation, such as Bakelite.

Figure 3:
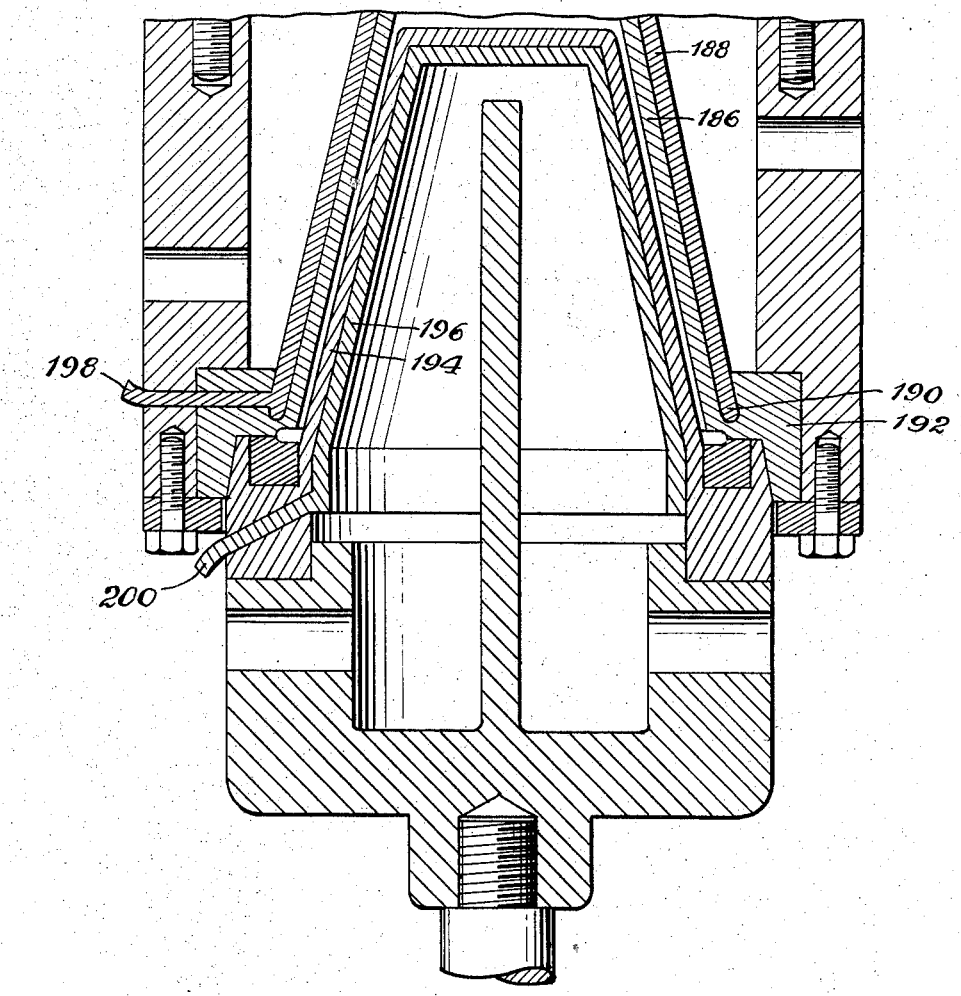
Figure 3 is a section of a modification.

In Figure 3 a variation has been shown in which, instead of chambers, dielectric electrodes are used. The cavity insert 186 is surrounded by a suitable metal electrode 188 which may be anchored at its lower end at 190 in the cavity's outstanding flange 192. The core 194 may have a metallic electrode covering 196. The cavity electrode may have a suitable connection 198 to a high frequency source as does the core electrode at 200.

In Figure 5 a variation has been shown in which an air pipe 202 is connected to a distributor or manifold 204. The tapered sides of the core element have plugs 206, brass or otherwise, inserted in the core wall, each such plug having a mounting ring 208. Each plug has a plurality of pinhole openings 210 on the order of .015" in diameter connected by a suitable pipe 212 to the manifold. In this arrangement, the pressure air will be ejected at a suitable number of locations, shown as 4 in Figure 5, around the wall to blow the molded part off of the core. This same type of air ejection unit could be used in any of the previous forms and has the advantage that the bottom of the cup or container will not be blown out. Rather, the pressure air is admitted along the sides of the cup and is effective over the entire container.

The use, operation and function of the invention are as follows:

One of the problems in rapid molding inexpensive thin-walled articles from foamable material is that it is difficult to fill the mold with the prefoamed beads and properly heat them. Many ways have been tried, but prior to this invention it has never been possible to successfully fill and heat the thin walls of the mold.

The mold, as such, is generally upright, small end up, and the prefoamed beads are transferred from the hopper 156 to the open upper end of the mold by a transfer or slide valve. The chamber 162 in the slide valve is constructed to carry a predetermined quantity of the beads from the hopper to the mold. The chamber 162 is first placed under the hopper by the slide valve actuating mechanism, be it the air cylinder 164 or otherwise. The prefoamed beads in the hopper fall by gravity into the chamber 162 but they might be agitated. During this time the core has been raised by its actuating mechanism so that the molding cavity is closed. The slide valve then moves from under the hopper to a position with the chamber 162 over the mold. The extension 170 on the sealing plate seals off the bottom of the hopper and is preferably made of a material so that heat will not be transferred readily to the hopper to prevent the beads from being further foamed prematurely.

With the chamber 162 of the slide valve over the molding cavity, the source of vacuum 138 through the support shaft draws the beads into the cavity, as set forth hereinafter, until the cavity is completely filled. At this point the actuating means moves the slide valve back to the left-hand position with the chamber 162 under the hopper. This places the heating element 178 in the slide valve over the open top of the mold so that it is effectively closed and covered by the heating element.

It should be noted that the chamber 162 in the slide valve is formed of two oppositely disposed truncated portions or areas, opening away from each other. The inwardly, somewhat larger upper portion 174 serves to funnel the partially foamed beads into the cavity, while the lower, downward and outwardly opening, somewhat smaller portion 176 serves as a smooth transfer and raking surface on the prefoamed beads when the slide valve moves from right to left closing off the top of the cavity with the heating element.

It should be noted that the heating element movably carried by the slide valve effectively closes the open top mold, but is constructed to be moved to one side during filling of the mold.

To fill the mold the slide valve is positioned with the chamber 162 over the open top mold. The core is in the raised position shown in Figure 1. At this point pressure air or any other suitable actuating medium is supplied through the connection 76 to the top of the ring 78 which forces the stand-off pins 80 down. These stand-off pins project slightly from the bottom of the retaining ring 44 and bear against the core retaining ring 108 on the core. The force supplied is sufficient to separate the core slightly from the cavity along the line 146 which is the abutting surfaces between the core cavity. The seal 152 prevents leakage outside of the channels 144 and engaging surfaces 146. The source of vacuum is communicated through the inlet 138 into the core support shaft 96, through the opening 142 into the chamber Y, through the channels or holes 144 to the slightly separated abutting surfaces 146 to the lower edge of the thin wall molding cavity. Thus the source of vacuum is communicated to the exact lower edge at the large end of the molding cavity to draw the prefoamed beads from the cavity 162 in the slide valve the full length of the cavity to effect efficient filling. In the presently used structure, the separation effected by the stand-off pins between the abutting surfaces at 146 is on the order of .015 inch, but it might be otherwise. This separation should be related to the mean diameter of the prefoamed beads so that a rough edge or flashing doesn't develop. A .015 inch separation works well with beads on the order of .060 to .070 inch in diameter. The source of vacuum is only effective inwardly through the slightly spaced abutting surfaces 146 as the seal 152 prevents communication outwardly. After a suitable length of time, the air source to the connection 76 is stopped or cut off and the stand-off pins are allowed to rise so that the abutting surfaces 146 come together, thereby tightly closing the mold. At approximately this same time, the slide valve may be actuated to move the heating element 176 over the top of the open mold which takes the transfer chamber 162 back under the hopper. At this point a suitable heating fluid, either hot air or steam, may be admitted to the cavity 48 around the cavity insert through the connection 70 and exhausted through the connection 72. Along with this, either hot air or steam may be admitted through the connection 114 to the chamber X in the core and exhausted by the connection 116.

After a suitable heating period, during which the heat from the hot air or steam is conveyed through the impervious walls of the cavity insert and core to further expand the beads, the flow of the heating fluid will cease. It should be understood that the wall sections of the molded article are intended to be thin, for example, on the order of .060 inch. Also, the wall thickness of the cavity insert and core should be thin so that the heat transfer rate will be at a maximum.

After the heating cycle a cooling fluid is admitted to the chamber 48 around the cavity insert, and also to the inside of the core, and this may be cold water or otherwise. This cooling fluid may be admitted to both the inside and the outside of the molding cavity through the same connections as the heating fluid, by proper valving and the like, none of which has been shown. The important point is that the mold parts themselves should be cooled. It is also desirable to effect a slight chill on the surface of the wall sections of the molded article.

The finished product is intended to be a thin wall container, for example a coffee cup or an ice cream carton. It should be rigid, despite its thin walls, and preferably should have a highly glazed rigid inner and outer surface with the body between the two glazes or shells highly cellular and resistant to heat transfer. The annular ring or notch 118 adjacent what will be the upper edge or lip of the container provides effective heat transfer to the somewhat thickened lip area A of the container so that it will be adequately heated and the beads therein will be fully expanded and also so that the chill or cooling will be effected.

To prevent leakage the outer cavity or chamber 48 around the cavity insert is suitably sealed at both top and bottom as at 52, 56 and 64.

After the part is formed, the core structure is lowered by its actuating mechanism (not shown), which is connected to the piston rod 84. On the way down the pinions 132 engage the rack portions 134 on the brackets which rotates the core structure carried on the support 96. This tilts or pivots the core structure to an inclined or horizontal position so that the molded cup or container may be removed or stripped in a direction away from the mold.

For ejection, pressure air may be supplied through the pipe 120 from any suitable source through the valve 122 to force the finished part off of the core. When the core structure is raised again, the racks and pinions 132 and 134 will again rotate it to approximately a vertical position and it will then be properly guided by the cam follower 130 which fits in the cam slot 128. This insures that the core will always be aligned properly with the cavity during re-entrance. Additionally, the pilot surfaces 148 guarantee accurate alignment and uniform spacing between the core and cavity inserts, thereby maintaining approximately a uniform wall section in all molded parts.

In Figures 1 and 2 the heating means has been referred to as either steam or hot air, but in Figure 4 dielectric heating has been indicated. Instead of chambers to accept a heating medium, for example, a liquid or steam, metallic electrode line the outer and inner surfaces of the cavity insert and core element and are provided with suitable connections to a source of high frequency energy. In this case, instead of a heating disc such as at 178 in Figure 1, a suitable metal electrode could be provided at the same location in the slide valve to close and heat the top of the open cavity.

From the above it should be noted that a so-called "open top molding cavity" is used, which is somewhat cup-shaped, with the small end up, so that the prefoamed beads may freely enter. For proper removal of the finished part the core is pivoted to either an inclined or horizontal position before the part is ejected. The stand-off pins communicate the source of vacuum to the lower large edge of the cup-shaped cavity so that the beads will be drawn fully to the bottom of the cavity. The transfer valve both heats the top of the cavity and adequately supplies it with a predetermined quantity of prefoamed beads from the hopper. When the transfer valve moves back for another load of prefoamed beads it has a tendency to scrape or push the prefoamed beads ahead of it on top of the core so that they all bunch, or at least tend to, on the side of the cavity adjacent the hopper, this being the left side of Figure 1. To prevent this, the top of the core may be irregular or undulated, such as shown in Figure 3. A plurality of smooth bottomed or well rounded grooves in the form of circles, as at B may be provided which break up or resist the tendency of the beads to move ahead of the slide valve. At the same time, raised circles or any suitable configurations will be formed in the bottom of the finished article which has a decidedly advantageous decorative effect.

In the dielectric form shown in Figure 3 it is desirable that an electrolyte be included with the prefoamed beads. An easy way of doing this is to spray or otherwise coat the beads with a jet of water. The moisture entrained with the beads in the molding cavity will serve as an efficient electrolyte to stimulate heating the beads under the dielectric energy. This may be done by drawing the beads through a saturated air or fog, or by injecting water or water particles into the beads. While the possible electrolyte has been referred to as water, it may be powdered aluminum, or any powdered metal for that matter. Additionally, the electrolyte could actually be included in the polymerizing process.

Whereas the preferred form and several modifications of the invention have been shown and described, it should be understood that suitable additional modification, substitutions, alterations and changes may be made without departing from the invention's fundamental theme. We therefore wish that the invention be unrestricted except as by the appended claims.

We claim:

1. In a molding machine for forming tapered cup-shaped plastic articles from partially foamed foamable plastic beads, a base, a generally upright frame on the base, mold parts on the frame defining a generally frusto-conical cup-shaped molding cavity, the mold parts including a cavity element opened at both ends and a core element inserted into the large end of the cavity element, at least one of the elements being movable relative to the frame so that the core element may be inserted in and withdrawn from the cavity element, a source on the frame for supplying partially foamed beads, a valve between the source and the cavity controlling the supply of beads, means for conveying beads from the source to the cavity in timed relationship to the operation of the valve, a movable closure element for the open top of the cavity for closing it when the cavity is filled with beads, and heating means for the cavity including a heating source in the core element for heating the inside of the cup-shaped article, a second heating source in the cavity element around the cavity for heating the outside of the cup-shaped article, and a third heating source in the movable closure element for heating the upwardly disposed bottom of the cup-shaped article.

2. The structure of claim 1 further characterized in that the first and second heating means include dielectric metal electrodes around the cavity element and inside of the core element, conforming to and generally equally spaced from the molding cavity, and the third heating means includes a dielectric metal electrode in the movable closure element conforming to the top of the cavity.

3. In a molding machine for forming frusto-conic cup-shaped plastic containers from partially expanded foamable plastic beads, a base, a generally upright frame on the base, molding parts thereon defining a frusto-conic molding cavity including impervious cavity and core elements movably mounted relative to each other so that the molding cavity may be opened and closed, the frusto-conic cavity being disposed upright, small end up, abutting surfaces on the core and cavity elements at the large end of the cavity for engagement when the parts are fully closed, a source on the frame for supplying partially expanded beads to the top of the cavity, a valve between the bead source and cavity, power means for opening and closing the molding cavity, a vacuum source for drawing beads from the bead source into the molding cavity in communication with the molding cavity at the abutting surfaces, and means for slightly separating the abutting surfaces when the molding cavity is closed so that the vacuum source will be communicated to the cavity to draw beads into the cavity.

4. The structure of claim 3 in which said last mentioned means includes a plurality of standoff pins for the cavity element opposed to the core element, and means for actuating the pins, as a group, so that they project and space the abutting surfaces slightly.

5. The structure of claim 3 further characterized by and including a seal adjacent but spaced from the abutting surfaces effective between the cavity and core elements when the abutting surfaces are slightly spaced by said last mentioned means so that the source of vacuum will be fully communicated to the cavity.

6. In a molding machine for forming tapered cup-shaped plastic containers, a base, a generally upright frame on the base, mold parts thereon defining a tapered cup-shaped molding cavity, the mold parts including a cavity element and a core element movable relative to each other so that the cavity may be opened and closed, the tapered cup-shaped cavity being disposed generally upright, small end up, means for opening and closing the mold parts, and stripping means for the core element including a plurality of openings in the tapered sides of the core element, and an air supply connection to the openings for supplying pressure air to the openings in the sides of the core element so that the sides of the molded container will be expanded to overcome any adherence between the outside of the core element and the inside of the container.

7. The structure of claim 6 further characterized in that the stripping means includes a plurality of equally spaced plugs inserted in the wall of the core element, and an air distributor manifold in the core element connected to each plug.

8. In a molding machine for forming plastic articles from partially foamed foamable plastic beads, a base, a generally upright frame on the base, mold parts on the frame defining a molding cavity, the mold parts including a pair of elements movable relative to each other so that the molding cavity may be opened and closed, power means for opening and closing the molding cavity, a source on the frame for supplying the partially foamed beads to the cavity, the source being to one side and out of alignment with the molding cavity, a slidable transfer valve mounted to move back and forth between the source and the cavity, the valve including a transfer chamber, substantially flat closing surfaces on the transfer valve, one such surface on each side of the transfer valve, the surfaces being on opposite sides of the transfer chamber so that when the transfer chamber is aligned with the source, one of the surfaces will close the molding cavity, and when the transfer chamber is aligned with the molding cavity the other such surface will close the source, and additional power means for reciprocating the transfer valve back and forth between the molding cavity and source on a cyclical basis.

9. In a molding machine for forming tapered plastic articles from partially foamed foamable plastic beads, a base, a generally upright frame on the base, mold parts on the frame defining a molding cavity, the mold parts including a cavity element open at both ends and a core element insertable into one end of the cavity element, the elements being movable relative to each other so that the core element may be withdrawn from and inserted into the cavity element on a cyclical basis, power means for moving the mold parts, a source on the frame for supplying partially foamed beads to the molding cavity, a valve between the source and the cavity for controlling the supply of beads to the cavity, including a movable closure element for the open top of the cavity for closing it when the cavity is filled with beads, the closure element being slidable in a lateral direction, relative to the axis of the cavity, so that it slides across the open top of the cavity, the surface of the core opposite the other open end of the cavity element being irregular so that movement of the beads in the molding cavity will be resisted during lateral movement of the transfer valve, and additional power means for reciprocating the transfer valve back and forth to supply beads to the molding cavity from the source on a cyclical basis.

10. In a molding machine for molding plastic articles from partially expanded foamable plastic beads, a base, a generally upright frame on the base, molding parts thereon defining a molding cavity including at least cavity and core elements, at least one such element being movably mounted relative to the other, abutting surfaces on the elements for engagement when the core element is fully inserted into the cavity element, a source on the frame for supplying partially expanded beads to the molding cavity, a valve between the bead source and the cavity for controlling the supply of such beads, power means for moving the one element and for operating the valve, a source of pressure differential for conveying beads from the bead source into the molding cavity, such pressure source being in communication with the molding cavity, means for slightly separating the abutting surfaces when the molding cavity is closed so that the source of pressure differential will create an air current through the cavity to convey beads from the bead source through the valve into the cavity, and power means for operating said last mentioned means so that the abutting surfaces will be separated when the cavity is being filled with beads but will abut when the cavity is filled.

11. In a molding machine for forming tapered cup-shaped plastic articles from partially foamed foamable plastic beads, a base, a generally upright frame on the base, mold parts on the frame defining a generally frusto-conical cup-shaped molding cavity, small end up, the mold parts including a cavity element open at both ends and a core element insertable into the large end of the cavity element, the elements being movable relative to each other, power means for moving the mold parts, a heating source in the core element, a second heating source in the cavity element around the cavity, a source on the frame for supplying the partially foamed beads, the bead source being to one side, above, and out of alignment with the center line of the molding cavity, a valve between the bead source and the cavity to control the supply of beads to the cavity, a source of air pressure differential for conveying beads from the bead source to the cavity, and a movable closure element for the top of the cavity having a third heating source for heating the upwardly disposed bottom of the cup-shaped articles.

12. In a molding machine for molding plastic articles from partially expanded foamable plastic beads, a base, a generally upright frame on the base, molding parts thereon defining a generally frusto-conical molding cavity, small end up, including at least a cavity element open at both ends and a core element insertable into one end of the cavity element, at least one such element being movably mounted relative to the other, abutting surfaces on the elements for engagement when the core element is fully inserted into the cavity element, a source on the frame for supplying partially expanded beads to the molding cavity, a valve between the bead source and the cavity for controlling the supply of such beads, power means for moving the one element and for operating the valve in timed relation to the cyclical operation of the machine, a source of air pressure differential for conveying beads from the bead source into the molding cavity when the valve is open, such air source being in communication with the molding cavity, and a peripheral outlet in communication with the large bottom end of the cavity so that the source of pressure differential will create an air current through the cavity when the valve is open to convey beads from the bead source into the cavity.

13. The structure of claim 12 further characterized in that the peripheral outlet in comunication with the large bottom end of the cavity includes means for separating the molding parts when the core element is initially inserted in the cavity element, the source of pressure differential being effective to convey the partially expanded foamable plastic beads from the bead source into the cavity while the molding parts are thus separated.

References Cited in the file of this patent

UNITED STATES PATENTS

| | | |
|---|---|---|
| Re. 20,460 | Jeffery | Aug. 3, 1937 |
| 526,717 | Laraway et al. | Oct. 2, 1894 |
| 934,112 | Walter | Sept. 14, 1909 |
| 1,442,967 | Papke | Jan. 23, 1923 |
| 2,212,483 | Soubier et al. | Aug. 20, 1940 |
| 2,305,433 | Kyle | Dec. 15, 1942 |
| 2,314,577 | Dunn | Mar. 23, 1943 |
| 2,396,406 | Anderson | Mar. 12, 1946 |
| 2,568,128 | Morris | Sept. 18, 1951 |
| 2,597,923 | Croston | May 27, 1952 |
| 2,828,509 | Smucker et al. | Apr. 1, 1958 |
| 2,836,848 | Zink et al. | June 3, 1958 |